Patented June 19, 1934

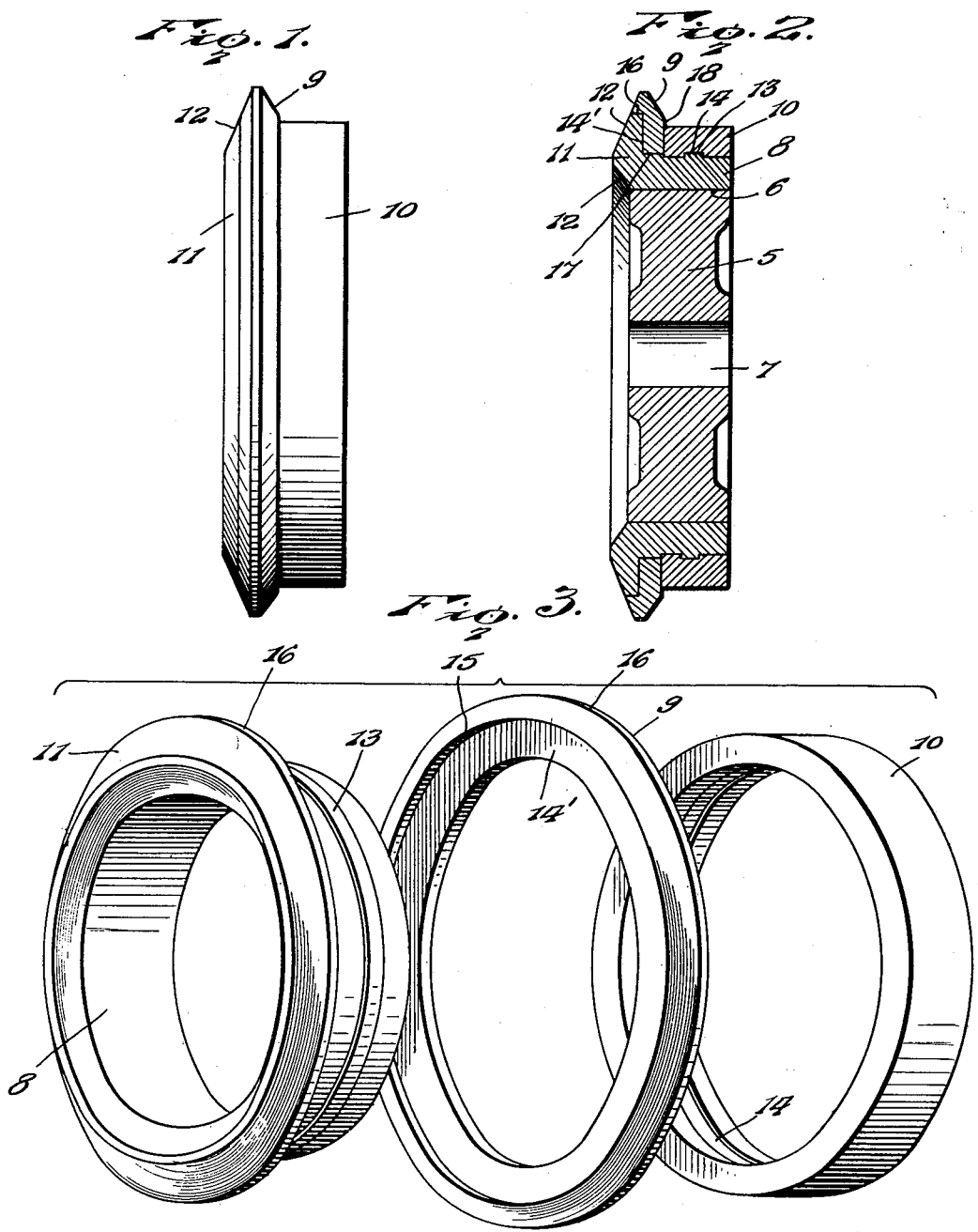

1,963,859

UNITED STATES PATENT OFFICE 1,963,859

TIRE FOR MINE LOCOMOTIVE WHEELS

George L. Micheal, Harlan, Ky., assignor to R. B. Maw, Pineville, Ky.

Application December 27, 1932, Serial No. 649,092

8 Claims. (Cl. 295—15)

This invention relates to mine car wheels and more particularly to a novel form of tire especially adapted for application to the wheels of mine locomotives.

In coal mine haulage, the treads of motor wheels wear rapidly, due to sanding of the tracks to increase friction, and as the treads of the wheels are much wider than the track rails the wear manifests itself in the form of a groove or channel in the tread next to the gauge flange, leaving a circumferential ridge which hammers and mutilates the switch frogs and otherwise causes damage to the track.

It has been proposed to remedy this defect and increase the life of the wheel by welding metal strips in the grooves or channels of the tread or by turning down the treads to eliminate the channels. Such methods, however, are not only expensive and inconvenient of operation, but fail to increase the effective life of the wheel for an appreciable period.

It has also been proposed to provide a two-part tire the tread of which is heated and shrunk onto the tire proper and while such tires have been used with more or less success, the constant hammering on the rails tends to loosen the tread.

The object of the present invention is to overcome these objectionable features by providing a wheel including tire and tread portions, one of which is provided with a rib adapted to enter a groove or channel in the other whereby when the tread is heated and shrunk onto the tire the parts will interlock and effectually prevent lateral displacement of the tread with respect to said wheel.

A further object of the invention is to provide a wheel having a separable renewal flange retained in position by engagement with the tire and tread portions of the wheel.

A further object is to provide the separable renewal flange with a circumferential seat adapted to receive the terminal flange of the tire whereby said renewal flange will have a shrinking fit at two points on the tire.

A still further object of the invention is generally to improve this class of devices so as to increase their utility, durability and efficiency.

In the accompanying drawing forming a part of the specification:

Figure 1 is a side view of a mine locomotive wheel provided with a tire constructed in accordance with the present invention.

Figure 2 is a vertical sectional view.

Figure 3 is a perspective view showing the component parts comprising the tire separated.

Similar numerals of reference indicate corresponding parts in all the figures of the drawing.

The sectional tire forming the subject matter of the present invention is particularly designed for application to the wheels of mine locomotives and by way of illustration is shown in connection with such a wheel in which 5 designates the wheel blank having the usual rim 6 and central opening 7 adapted to receive an axle. The tire comprises three units, a main tire section 8, a separable and renewable flange 9, and a tread 10. The tire 8 fits over the rim 6 of the wheel blank and is provided at one end with a terminal laterally extended flange 11, the outer face of which is preferably thickened and inclined or beveled in opposite directions, as indicated at 12, so as to reinforce and strengthen the flange at the inner face of the wheel. The outer surface of the tire 8 is provided with a relatively short circumferential rib or bead 13 which fits in a correspondingly shaped groove or channel 14 provided in the inner face of the thread portion 10 so that when the tread is heated and shrunk on the tire, the rib and groove will interlock and thus effectually prevent lateral displacement of the tread on the wheel. The renewable flange 9 is interposed between the terminal flange 11 and the adjacent edge of the tread 10, the inner face of the flange 9 being cut away to form a circumferential seat 14' adapted to receive the flange 11 and defining an annular shoulder 15 which overlaps and bears against the outer turned edge 16 of the flange 11. The inner face of the renewable flange 9 is preferably inclined to conform to and forms a continuation of the adjacent inclined face 12 of the flange 11 so that when the parts are assembled, a smooth unobstructed surface will be presented at the inner face of the wheel. The circumferential locking rib 13 is preferably formed by pressing or stamping the metal at the outer surface of the tire 8 and this pressing or stamping operation results in the formation of a slight shoulder 17 of the same width as the renewable flange and against which said renewable flange bears when the parts are assembled. It will thus be seen that the renewable flange has a shrinking fit with the tire both at the seat 14' and at the shoulder 17 and that inasmuch as the tread 10 bears against the outer straight face 18 of the renewable flange, the latter is securely held against displacement.

In assembling the tire, the renewable flange is slipped over the member 8 and pressed against the terminal flange 11 with the latter engaging the seat 14, after which the tread 10 is heated and then slipped over the tire and allowed to cocl, the shrinkage causing the rib 13 to interlock with the groove 14 and thus not only hold the renewable flange in position but prevent lateral displacement of the tread due to the hammering or pounding action thereon when the locomotive is in motion. Should a groove or channel form in the wearing face of the tread 10, or the flange 9 become broken or damaged from any cause, said parts may be readily removed and replaced by detaching the tread 10 and fitting a new tread or flange in place on the wheel and again shrinking the tread in position on the tire. It will, of course, be understood that the units comprising the sectional tire, when assembled in the manner before mentioned, may be shrunk onto the rim of the wheel blank or fastened thereto in any suitable or desired manner. The tire 8 forms a firm, solid foundation for the tread 10 and renewable flange 9 and the excess metal on the terminal flange 11 adds additional strength and rigidity thereto so that the effective life of the wheel is materially increased and the necessity for renewal of the parts correspondingly decreased. It is to be particularly noted that the renewable flange is interposed between the terminal flange 11 and the tread 10 and as the tread 10 contacts with the adjacent face of the renewable flange, said flange is effectually locked against accidental displacement. While the sectional tire is principally designed for use in connection with the wheels of mine locomotives, it will, of course, be understood that said tire may be used on passenger locomotives or car wheels of any description without departing from the spirit of the invention.

It will furthermore be understood that while it is preferred to use the three units comprising the tire assembled as shown in Figure 2 of the drawing, if desired, the wearing parts of the tire such as the tread and rail engaging flange may be applied directly to the rim of the wheel without the interposition or use of the third unit or tire proper.

Having thus described the invention, what I claim is:

1. A device of the class described comprising a tire having a circumferential flange, a tread, and a renewable flange interposed between the circumferential flange and tread and bearing directly against and having shrinkable contact with the outer surface of said tire.

2. A device of the class described comprising a tire and tread having interlocking parts, a circumferential flange on the tire, and a renewable flange interposed between the tire and circumferential flange at one side of said interlocking parts and bearing directly against and having shrinkable contact with the outer surface of said tire.

3. A device of the class described comprising a wheel body, a tire fitting the rim of the wheel body and provided with a circumferential flange, a separable flange bearing against and rigidly secured to the tire, a tread engaging the tire and separable flange, and a rib and groove connection between the adjacent faces of the tire and tread for preventing lateral displacement of the latter.

4. A device of the class described comprising a tire having a laterally extending circumferential flange, a separable flange bearing directly against and having shrinkable contact with the outer surface of the tire and provided with a seat receiving the circumferential flange, a tread fitting the tire and bearing against the separable flange, and a rib and groove connection between the tire and tread.

5. A device of the class described comprising a tire having a laterally extending circumferential flange at one end thereof, the inner face of which is thickened and inclined outwardly, a separable renewable flange having a circumferential seat in one side thereof adapted to receive the circumferential flange and having its inner face at said side inclined to conform to and forming a continuation of the inclined face of the circumferential flange, a tread engaging the tire and bearing against the renewable flange, and interlocking means between the tread and tire.

6. A device of the class described comprising a tire having a laterally extending flange, the outer face of the tire being depressed to form a circumferential rib defining an annular shoulder adjacent the circumferential flange, a renewable flange fitted on said shoulder and provided with a circumferential seat adapted to receive the circumferential flange of the tire, a tread engaging the tire and bearing against the renewable flange, and a rib and groove connection between the tire and tread for preventing lateral displacement of the latter.

7. A device of the class described comprising a tire having a thickened circumferential flange at one end thereof, a renewable flange having a seat receiving the circumferential flange and having shrinkable contact with the tire and circumferential flange respectively, a tread engaging the tire and bearing against the renewable flange, and means carried by the tire and tread respectively for preventing lateral displacement of one with respect to the other when the tread is shrunk in position on said tire.

8. A device of the class described comprising a tire having a terminal circumferential flange, the outer edge of which is formed with a transversely flat annular surface, a renewable flange having a seat formed in one side thereof and adapted to receive the terminal flange and defining a shoulder adapted to bear against the annular surface of the terminal flange, the other side of the renewable flange being straight and the inner circumference of the renewable flange adapted to bear against the tire, a tread fitted to the tire and bearing against the straight side of the renewable flange, and a rib and groove connection between the tire and tread for preventing lateral displacement of said tread and holding the tread in engagement with the renewable flange.

GEORGE L. MICHEAL. [L. S.]